(12) United States Patent
Bessho

(10) Patent No.: US 12,703,242 B2
(45) Date of Patent: Aug. 11, 2026

(54) UTILITY VEHICLE

(71) Applicant: Kubota Corporation, Osaka (JP)

(72) Inventor: Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 289 days.

(21) Appl. No.: 18/378,333

(22) Filed: Oct. 10, 2023

(65) Prior Publication Data

US 2024/0157790 A1 May 16, 2024

(30) Foreign Application Priority Data

Nov. 11, 2022 (JP) ................................ 2022-181171

(51) Int. Cl.
*B60K 31/00* (2006.01)
*B60L 15/20* (2006.01)

(52) U.S. Cl.
CPC ...... *B60K 31/00* (2013.01); *B60K 2031/0091* (2013.01); *B60L 15/20* (2013.01); *B60L 2200/40* (2013.01)

(58) Field of Classification Search
CPC . B60K 31/00; B60K 2031/0091; B60L 15/20; B60L 2200/40
See application file for complete search history.

(56) References Cited

U.S. PATENT DOCUMENTS 2,776,581 A * 1/1957 Hamlin .................. B60K 31/00 74/513
2,822,882 A * 2/1958 Campbell ................. G01P 1/11 180/178
7,822,514 B1 10/2010 Erickson
2019/0161081 A1 5/2019 Ogura
2021/0206263 A1 7/2021 Grajkowski et al.
2023/0099758 A1* 3/2023 Nakane ............... B60W 30/146 701/93

FOREIGN PATENT DOCUMENTS

JP 2012187030 A 10/2012
JP 2019103593 A 6/2019

* cited by examiner

*Primary Examiner* — Syed O Hasan
(74) *Attorney, Agent, or Firm* — The Webb Law Firm

(57) ABSTRACT

A utility vehicle includes traveling devices 11, 12 that support a travel body on a ground surface; a motive power unit provided on the travel body; a power transmission device 20 that transmits motive power from the motive power unit to the traveling devices 11, 12 as travel power; a speed change operation tool 18 that changes a vehicle speed, which is the speed of the travel power, a vehicle speed limiting operation tool 34 that sets an upper limit of the vehicle speed, and a vehicle speed limiting operation prohibition unit 35 that prohibits operation of the vehicle speed limiting operation tool.

2 Claims, 6 Drawing Sheets

14
21(20)
12
2
2m
1
13
16
17
15
18
3
23
11

21(20)
22
12
12
24
2m
2
14
15
16
17
13
31
32
3
23
11
11

13
3
31
32
36
37
34
(35)
33
17
18
15
15

UTILITY VEHICLE

CROSS-REFERENCE TO RELATED APPLICATION

This application claims priority to Japanese Patent Application No. 2022-181171 filed Nov. 11, 2022, the disclosure of which is hereby incorporated by reference in its entirety.

BACKGROUND OF THE INVENTION

1. Field of the Invention

The present invention relates to a utility vehicle including a vehicle speed limiting operation tool.

2. Description of Related Art

Since utility vehicles travel not only on roads but also off-road, it is important to drive within an appropriate vehicle speed range according to the skill and driving purpose of the driver. Patent Document 1 (U.S. Pat. No. 7,822,514) discloses a vehicle including a system that allows each driver to set vehicle parameters such as vehicle speed and engine rotation speed. When a transmitter incorporated in an ignition key or the like transmits an identification code to a system controller, the vehicle parameters corresponding to the identification code are set. For example, when driving a vehicle using a specific ignition key, the vehicle is limited to vehicle speeds defined by this ignition key.

Patent Document 2 (US Patent Publication No. 2021/0206263) discloses a vehicle whose maximum speed is limited in relation to the skill level of the driver. This limited maximum speed can be modified by the driver. Also, when a GPS device detects that the vehicle is located outside or inside of a predetermined region, the engine is stopped or the vehicle speed is limited.

In the vehicles according to Patent Documents 1 and 2, the vehicle speed is limited automatically or through an operation performed by the driver. However, no consideration is given to a mechanism for prohibiting a vehicle speed limited by a specific person such as a vehicle manager from being changed by anyone other than the specific person. In view of such circumstances, it is an object of the present invention to provide a utility vehicle having a structure by which a vehicle speed limit set by a specific person is prohibited from being changed by anyone other than the specific person.

SUMMARY OF THE INVENTION

A utility vehicle according to the invention includes: a travel body; a travel device configured to support the travel body on a ground surface; a motive power unit provided on the travel body; a power transmission device configured to transmit motive power from the motive power unit to the travel device as travel power; a speed change operation tool configured to change a vehicle speed, which is a speed of the travel power; a vehicle speed limiting operation tool configured to set an upper limit of the vehicle speed; and a vehicle speed limiting operation prohibition unit configured to selectively prohibit operation of the vehicle speed limiting operation tool.

According to this configuration, although an upper-limit vehicle speed, which is the upper limit of the vehicle speed, can be set by operating the vehicle speed limiting operation tool, operation of the vehicle speed limiting operation tool can be prohibited by the vehicle speed limiting operation prohibition unit. Accordingly, after the specific person has set the upper-limit vehicle speed, if it is not desired that the set upper limit vehicle speed is changed by a person other than the specific person, the specific person can use the vehicle speed limiting operation prohibition unit to prohibit an operation of changing the upper-limit vehicle speed with the vehicle speed limiting operation tool. In addition, if the set upper-limit vehicle speed may be changed by a person other than the specific person, setting the vehicle speed limiting operation prohibition unit to a vehicle speed operation permission state enables a person other than the specific person to change the upper-limit vehicle speed using the vehicle speed limiting operation tool.

In the present invention, the vehicle speed limiting operation prohibition unit can be configured as an attachment and detachment mechanism for attaching and detaching the vehicle speed limiting operation tool to and from a member included in the travel body. In this configuration, after the specific person sets the upper-limit vehicle speed, the vehicle speed limiting operation tool can be detached from the travel body using the attachment and detachment mechanism of the vehicle speed limiting operation prohibition unit. That is, since the vehicle speed limiting operation tool used for setting and changing the upper limit of the vehicle speed is detached from the travel body, it is impossible to change the upper-limit vehicle speed using the vehicle speed limiting operation tool. In this mode, the state in which the vehicle speed limiting operation prohibition unit is attached to the member included in the travel body is the vehicle speed operation permission state of the vehicle speed limiting operation prohibition unit, and the state in which the vehicle speed limiting operation prohibition unit is detached from the member included in the travel body is the vehicle speed operation prohibition state of the vehicle speed limiting operation prohibition unit.

The present invention further includes a vehicle speed upper limit display section configured to indicate the upper limit set by the vehicle speed limiting operation tool, in which even after the vehicle speed limiting operation tool is detached from the travel body, the vehicle speed upper limit display section is held in the travel body. With this configuration, not only does the vehicle speed upper limit display section make it easy to set the upper-limit vehicle speed using the vehicle speed limiting operation tool, but even if the vehicle speed limiting operation tool is detached from the travel body, the vehicle speed upper limit set at that time is displayed on the vehicle speed upper limit display section, and therefore the driver can easily find out the vehicle speed upper limit, which is convenient.

As the vehicle speed upper limit display section, a display device that undergoes electronic display control in response to the operation of the vehicle speed limiting operation tool may be used, but a configuration having the vehicle speed upper limit indicator that is mechanically linked to the operation of the vehicle speed limiting operation tool is advantageous in terms of cost. Also, such a configuration has high resilience against vibration, wind, and rain, which is advantageous for off-road vehicles and the like.

Although a dial operation type or a slide operation type can be adopted as the vehicle speed limiting operation tool, it is convenient, in terms of operability and space saving, for the vehicle speed limiting operation tool to be a dial-type operation tool.

DESCRIPTION OF THE INVENTION

Note that in this specification, unless otherwise specified, “front” means frontward in the vehicle body front-rear direction (travel direction), and “rear” means rearward in the vehicle body front-rear direction (travel direction). Also, the left-right direction or the lateral direction means the vehicle body transverse direction (vehicle body width direction) orthogonal to the vehicle body front-rear direction. “Upper” or “lower” refers to a positional relationship in the vertical direction (perpendicular direction) of the vehicle body, and indicates a positional relationship based on the height above ground.

Figure 1:
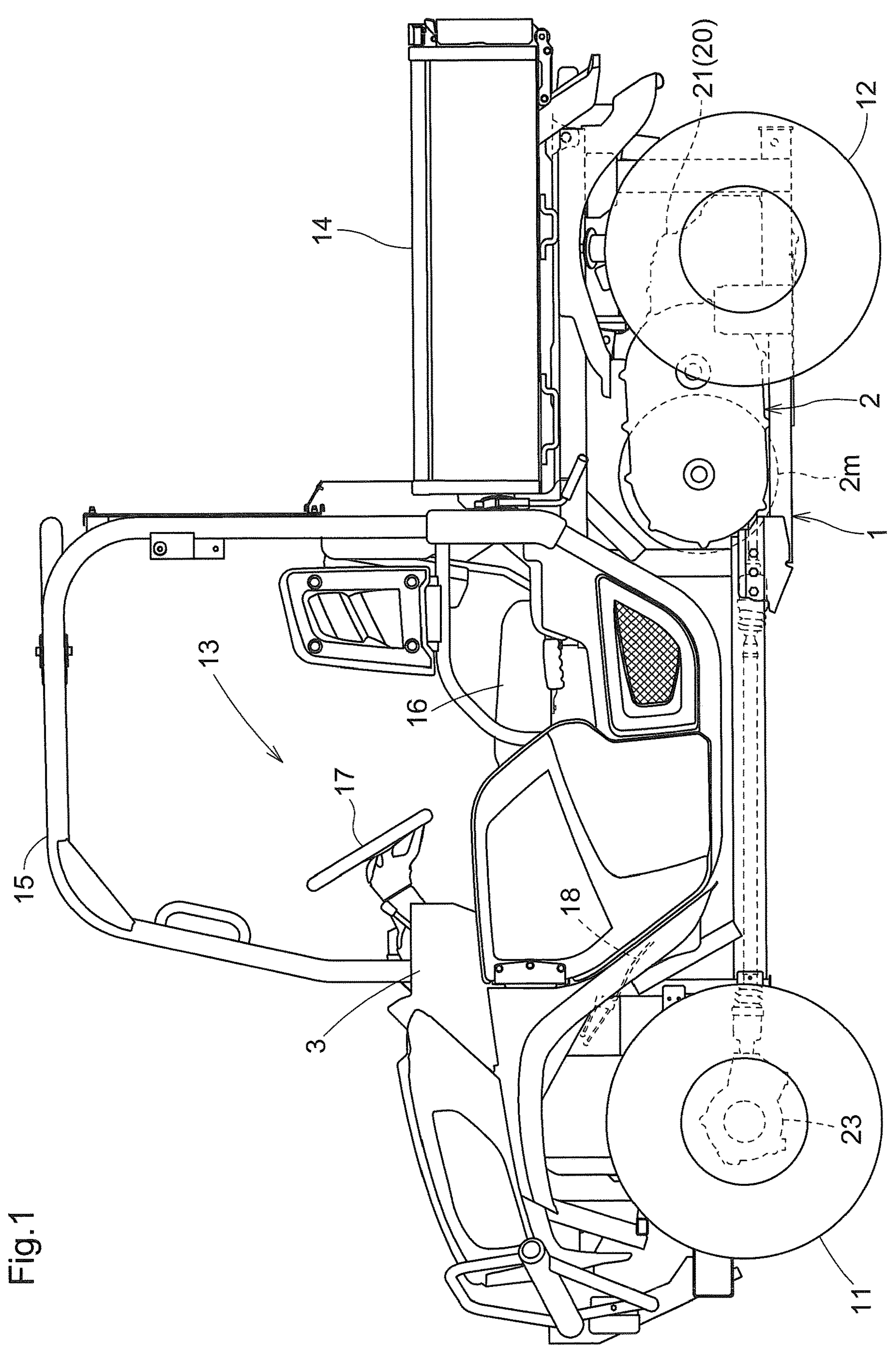
FIG. 1 is a side view of a utility vehicle.
Figure 2:
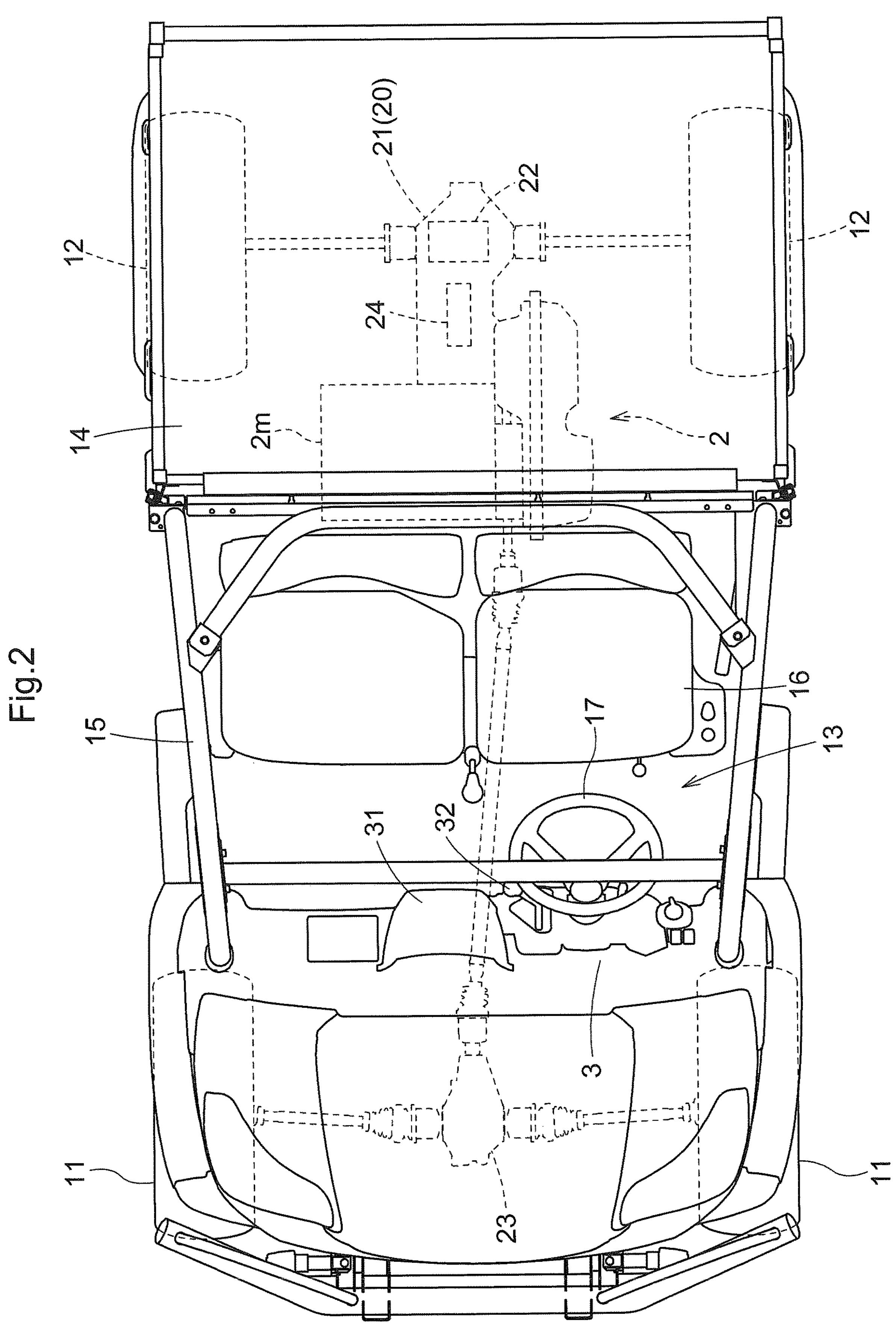
FIG. 2 is a plan view of the utility vehicle.

An embodiment, which is an example of the present invention, will be described below with reference to the drawings. An example of a utility vehicle shown in FIGS. 1 and 2 is formed as a vehicle that can be used for various purposes such as transportation of a load and recreation. Note that the utility vehicle according to the invention of the present application also encompasses an all-terrain vehicle (ATV), a buggy, an off-road vehicle, an agricultural vehicle, and a civil engineering vehicle.

The illustrated utility vehicle includes a pair of left and right front wheels 11 that can be driven and steered, and a pair of left and right rear wheels 12 that can be driven, as traveling devices. The travel body 1 can travel using the pair of left and right front wheels 11 and the pair of left and right rear wheels 12. The central portion of the travel body 1 is provided with a driving section 13 in which an operator rides and performs a driving operation. The rear portion of the travel body 1 is provided with a loading platform 14 on which cargo can be loaded. A motive power unit 2 is provided on the travel body 1 in a region below the loading platform 14 of the travel body 1. A power transmission device 20 that transmits motive power from the motive power unit 2 to the traveling device as travel power is also provided on the travel body 1.

The driving section 13 is surrounded and protected by a frame-shaped ROPS frame 15. The driving section 13 is provided with a driver’s seat 16 on which an operator is to be seated. Also, a front panel 3 to which various operation tools and display devices are attached and a steering wheel 17 for steering the left and right front wheels 11 are provided in front of the driver’s seat 16 in the driving section 13. An accelerator pedal serving as a speed change operation tool 18 is provided on the floor located below the steering wheel 17.

In this embodiment, the motive power unit 2 has an electric motor 2*m* as a core member, but as another embodiment, the motive power unit 2 may also use an internal combustion engine 2*e* (see FIG. 7) such as a gasoline engine as a core member.

As shown in FIG. 2, the power transmission device 20 to which motive power from the motive power unit 2 is input includes a gear transmission mechanism 21, a rear wheel differential mechanism 22, a front wheel differential mechanism 23, and the like. The gear transmission mechanism 21 in this embodiment includes an auxiliary transmission 24 according to which a high gear and a low gear can be selected using a high and low gear shift clutch.

Figure 3:
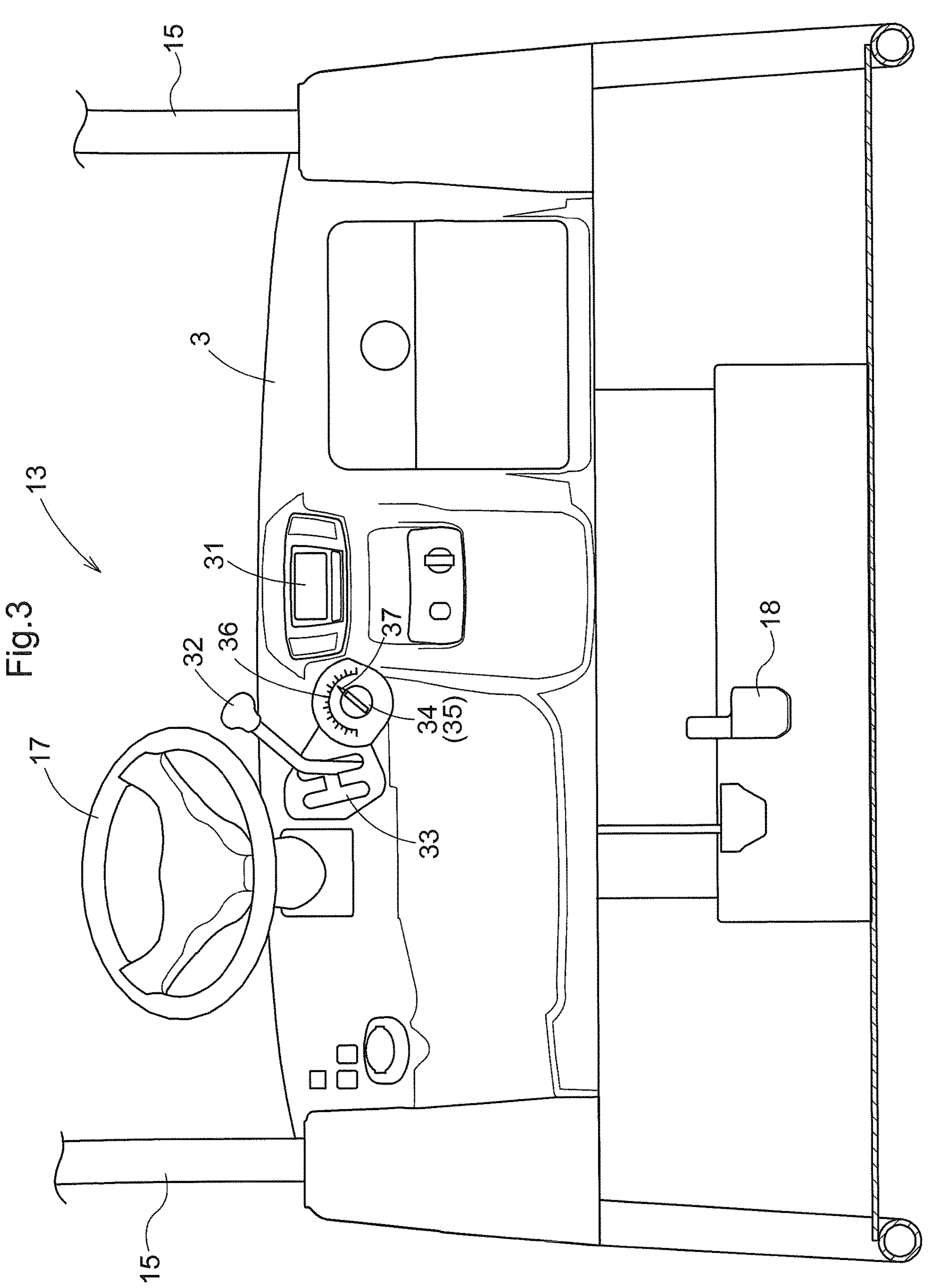
FIG. 3 is a front view of a surrounding area of an operation panel in a driving section.

As shown in FIG. 3, a meter panel 31 having a liquid crystal panel and an LED lamp, an auxiliary gear shift lever 32 for switching the gears of the auxiliary transmission 24, a vehicle speed limiting operation tool 34, and the like are attached to the front panel 3. The auxiliary gear shift lever 32 can be displaced along a substantially H-shaped gear shift operation path 33 formed in the front panel 3.

Figure 4:
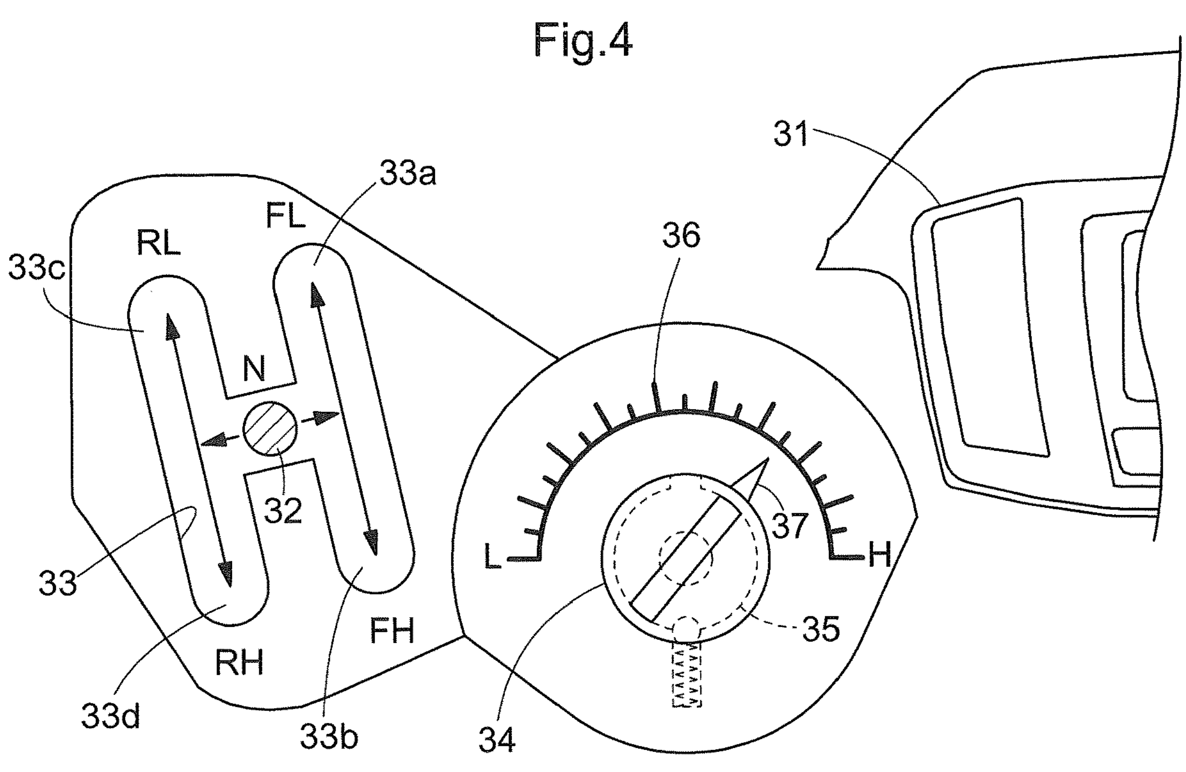
FIG. 4 is a schematic diagram schematically showing an auxiliary shift lever, a vehicle speed limiting operation tool, and a vehicle speed limiting operation prohibition unit.

As shown in FIG. 4, the four path ends of the gear shift operation path 33 are used as a forward low gear position 33*a*, a forward high gear position 33*b*, a reverse low gear position 33*c*, and a reverse high gear position 33*d*. The intermediate position between the forward low gear position 33*a* and the forward high gear position 33*b* is a forward neutral position, the intermediate position between the reverse low gear position 33*c* and the reverse high gear position 33*d* is a reverse neutral position, and the forward neutral position and the reverse neutral position are connected to each other by a lateral operation path. That is, in this embodiment, the auxiliary gear shift lever 32 is used also as a forward and reverse switching lever for switching between forward and reverse. Of course, as another embodiment, it is also possible to form the forward and reverse switching lever and the auxiliary gear shift lever 32 separately from each other.

Figure 5:
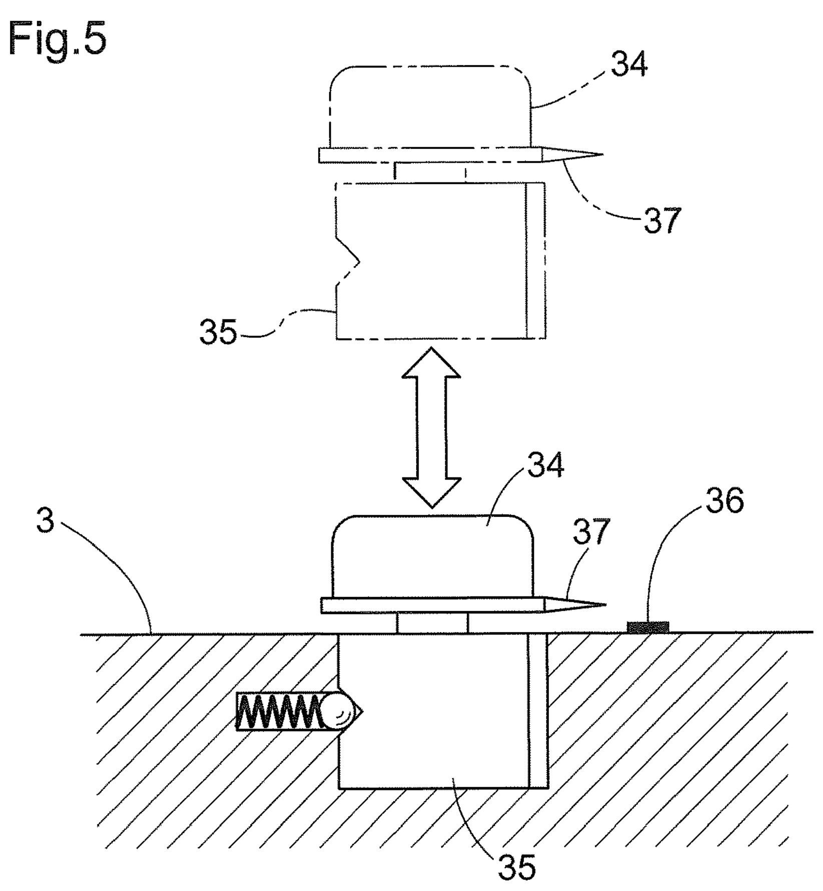
FIG. 5 is a schematic cross-sectional view schematically showing a vehicle speed limiting operation tool and a vehicle speed limiting operation prohibition unit.

In this embodiment, the vehicle speed limiting operation tool 34 for setting the upper limit of the vehicle speed is formed as a circular dial-type operation tool. As schematically shown in FIGS. 4 and 5, the vehicle speed limiting operation tool 34 is fixed to a vehicle speed limiting operation prohibition unit 35 that is detachably attached to the front panel 3 as a member of the travel body 1. That is, the vehicle speed limiting operation tool 34 is indirectly attached to the front panel 3 via the vehicle speed limiting operation prohibition unit 35. A corresponding portion of the front panel 3 to and from which the vehicle speed limiting operation prohibition unit 35 can be attached and detached is formed into a socket shape for receiving the vehicle speed limiting operation prohibition unit 35. Furthermore, the vehicle speed limiting operation prohibition unit 35 functions as a mechanism for attaching to and detaching from the front panel 3 such that the vehicle speed limiting operation prohibition unit 35 can be attached to and detached from the member (front panel 3) included in the travel body 1, in one piece with the vehicle speed limiting operation tool 34. The vehicle speed limiting operation prohibition unit 35 has an engaging portion that detachably engages with the front panel 3 such that the vehicle speed limiting operation prohibition unit 35 attached to the front panel 3 is reliably fixed.

As shown in FIG. 4, an arc-shaped vehicle speed upper limit display section 36 is provided in the surrounding area of the vehicle speed limiting operation tool 34. An arc-shaped scale indicating the vehicle speed is formed in the vehicle speed upper limit display section 36, and the vehicle speed upper limit display section 36 is provided with a vehicle speed upper limit indicator 37 that is mechanically linked with the operation of the vehicle speed limiting operation tool 34 above the arc-shaped scale. A link connecting the vehicle speed limiting operation tool 34 and the vehicle speed upper limit indicator 37 in a linked manner has a two-member structure so that it can be separated when the vehicle speed limiting operation prohibition unit 35 is detached.

Figure 6:
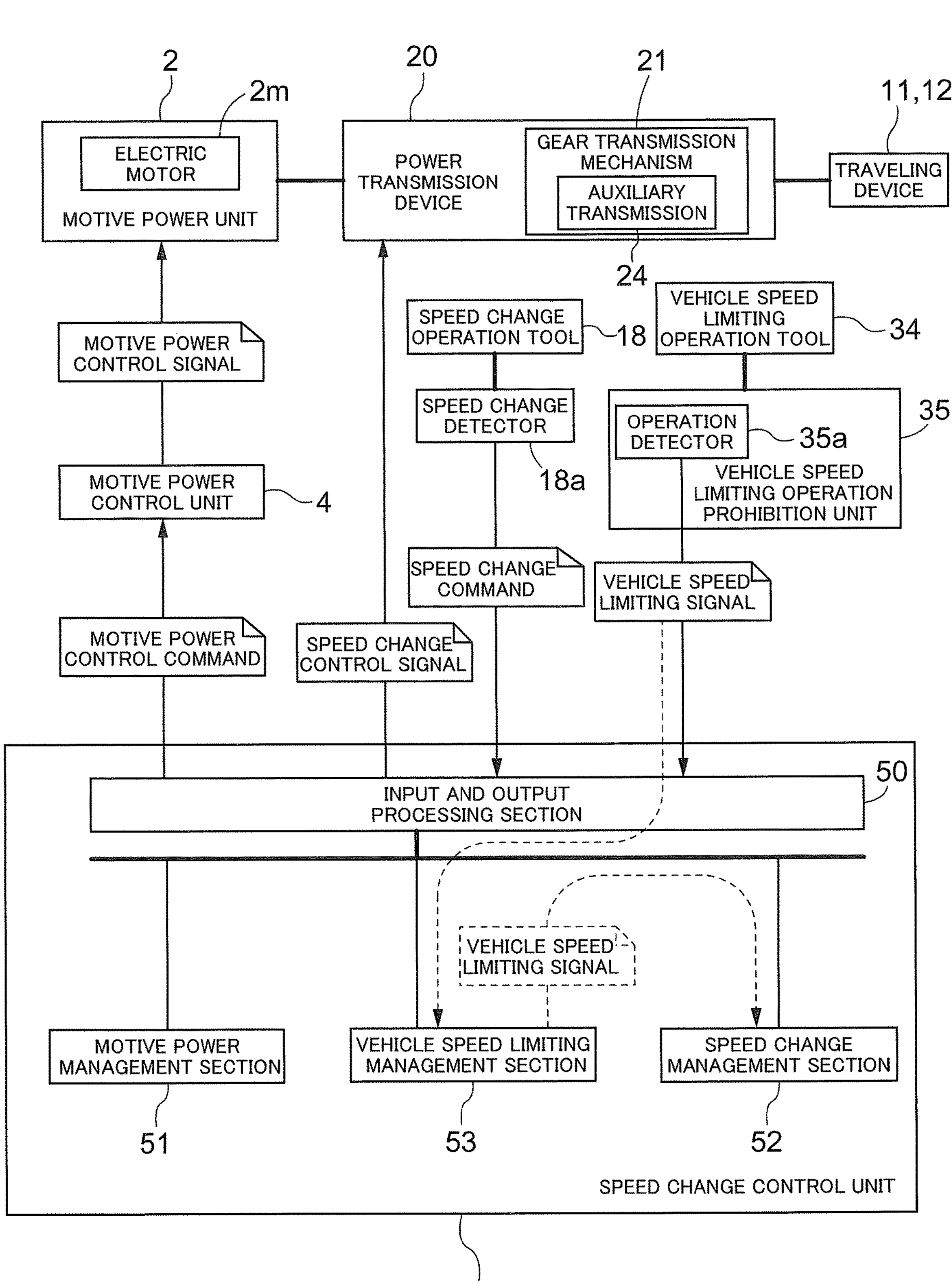
FIG. 6 is a functional block diagram showing a control system of the utility vehicle.

FIG. 6 is a functional block diagram showing an example of a speed change control system of a utility vehicle. This speed change control system includes a motive power control unit 4 and a speed change control unit 5. The motive power control unit 4 is formed as a motor control unit in this embodiment, and based on a motive power control command (motor speed command) from the speed change control unit 5, provides a motive power control signal to an inverter (not shown) and controls the speed of the electric motor 2*m*.

The speed change control unit 5 includes an input and output processing section 50, a motive power management section 51, a speed change management section 52, and a vehicle speed limiting management section 53. The input and output processing section 50 receives input of a vehicle speed limiting command based on the operation amount of the vehicle speed limiting operation tool 34, a speed change command (vehicle speed command) based on the operation amount of the speed change operation tool 18, and the like, and provides them to each functional portion of the speed change control unit 5. The vehicle speed limiting command is sent from an operation detector 35*a* that detects the operation amount of the vehicle speed limiting operation tool 34 incorporated in the vehicle speed limiting operation prohibition unit 35. Also, the input and output processing section 50 provides speed change control signals and motive power control commands generated by each functional section of the speed change control unit 5 to the motive power control unit 4.

The motive power management section 51 generates a motive power control command based on a speed change command given through the speed change operation tool 18, a command regarding the rotational speed of the electric motor 2*m* from the speed change management section 52, or the like, and supplies the generated motive power control command to the motive power control unit 4. The speed change management section 52 calculates the rotational speed of the electric motor 2*m*, the gear ratio of the power transmission device 20, and the like from the calculated target vehicle speed based on the speed change command, provides a command relating to the rotational speed of the electric motor 2*m* to the motive power management section 51, and provides the speed change control command to the power transmission device 20.

A vehicle speed limiting management section 53 generates a vehicle speed limiting command based on the vehicle speed control command generated by the operation detector 35*a* through the operation of the vehicle speed limiting operation tool 34, and provides the vehicle speed limiting command to the speed change management section 52. The vehicle speed limiting management section 53 has a function of recording the input vehicle speed limiting command (vehicle speed limit). When a new vehicle speed limit command is input, the previously-recorded vehicle speed limit command is overwritten with the newly-input vehicle speed limiting command.

By detaching the vehicle speed limiting operation prohibition unit 35 from the front panel 3, the vehicle speed limiting operation tool 34 is also detached from the front panel 3. This makes it impossible to rewrite the vehicle speed control command using the vehicle speed limiting operation tool 34, and the vehicle speed limiting command based on the vehicle speed control command (vehicle speed limit) recorded at that time is maintained. In order to rewrite the vehicle speed control command and generate a new vehicle speed limiting command, the vehicle speed limiting operation prohibition unit 35 needs to be attached to the front panel 3 together with the vehicle speed limiting operation tool 34, the vehicle speed limiting operation tool 34 needs to be operated, and a new vehicle speed limiting command needs to be sent to the vehicle speed limiting management section 53.

Other Embodiments (1) In the embodiment described above, the vehicle speed limiting operation tool 34 and the vehicle speed limiting operation prohibition unit 35 were arranged on the front panel 3, but they may also be arranged at another location such as the steering wheel 17 or the driver's seat 16. Also, the operation detector 35*a* that detects the operation amount of the vehicle speed limiting operation tool 34 may also be configured to remain on the travel body 1 side. Furthermore, the operation detector 35*a* may also be connected wirelessly to the speed change control unit 5 instead of being connected by wire.

Figure 7:
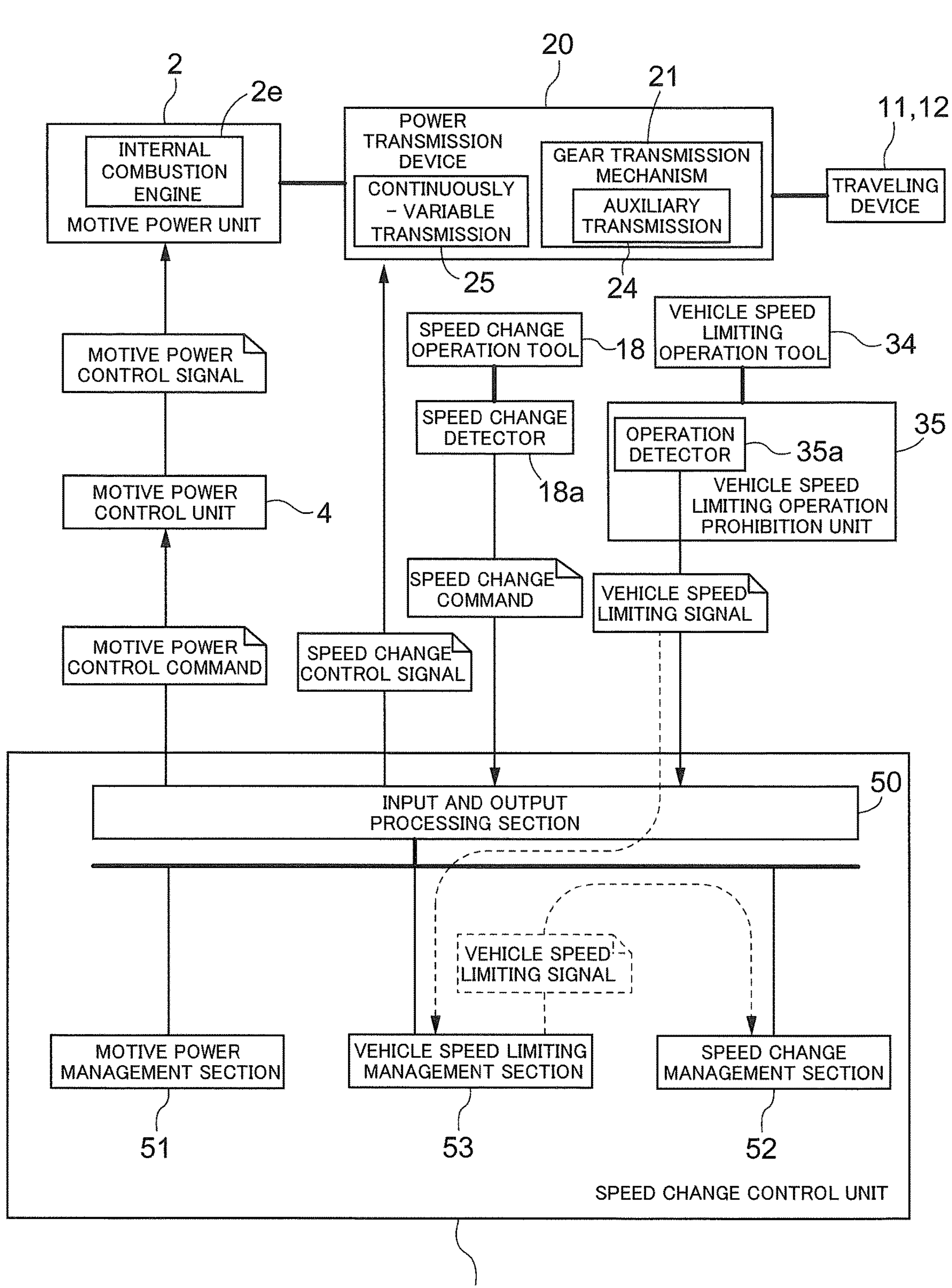
FIG. 7 is a functional block diagram showing a control system of a utility vehicle in another embodiment.

(2) In the embodiment described above, the electric motor 2*m* was used in the motive power unit 2, but as shown in FIG. 7, an internal combustion engine 2*e* may also be used. In that case, the motive power control unit 4 is formed as a well-known engine control unit. Unlike the electric motor 2*m*, the internal combustion engine 2*e* cannot switch the rotational direction, and its efficient rotational speed range is not as wide as that of the electric motor 2*m*. For this reason, the motive power transmission device 20 is provided with a continuously-variable transmission 25 or a multi-stage transmission, and the gear transmission mechanism 21 is provided with a forward and reverse switching device.

(3) In the above-described embodiment, the vehicle speed limiting operation tool 34 and the vehicle speed limiting operation prohibition unit 35 were formed separately, but the vehicle speed limiting operation tool 34 and the vehicle speed limiting operation prohibition unit 35 may also be formed in one piece.

(4) In the above-described embodiment, the traveling device includes a pair of left and right front wheels 11 and a pair of left and right rear wheels 12, but the traveling device may also be of a three-wheel type or a two-wheel type.

Note that the configurations disclosed in the above embodiments (including other embodiments, the same applies hereinafter) can be applied in combination with the configurations disclosed in other embodiments as long as there is no contradiction. The embodiments disclosed in this specification are illustrative, and the embodiments of the present invention are not limited thereto, and can be modified as appropriate without departing from the object of the present invention.

INDUSTRIAL APPLICABILITY

The present invention is applicable to utility vehicles in a broad sense.

LIST OF REFERENCE SIGNS

1 Travel body
2 Motive power unit
2*e* Internal combustion engine
2*m* Electric motor
4 Motive power control unit

17 Steering wheel
18 Speed change operation tool
20 Power transmission device
21 Gear transmission mechanism
22 Rear wheel differential mechanism
23 Front wheel differential mechanism
24 Auxiliary transmission
25 Continuously-variable transmission
32 Auxiliary gear shift lever
33 Gear shift operation path
33*a* Forward low gear position
33*b* Forward high gear position
33*c* Reverse low gear position
33*d* Reverse high gear position
34 Vehicle speed limiting operation tool
35 Vehicle speed limiting operation prohibition unit
35*a* Operation detector
36 Vehicle speed upper limit display section
37 Vehicle speed upper limit indicator
5 Speed change control unit
50 Input and output processing section
51 Motive power management section
52 Speed change management section
53 Vehicle speed limiting management section

What is claimed is:

1. A utility vehicle comprising:

a travel body;

a travel device configured to support the travel body on a ground surface;

a motive power unit provided on the travel body;

a power transmission device configured to transmit motive power from the motive power unit to the travel device as travel power;

a speed change operation tool configured to change a vehicle speed, which is a speed of the travel power;

a vehicle speed limiting operation tool comprising a dial-type operation tool configured to set an upper limit of the vehicle speed;

a vehicle speed limiting operation prohibition unit configured to selectively prohibit operation of the vehicle speed limiting operation tool; and a vehicle speed upper limit display section configured to indicate the upper limit set by the vehicle speed limiting operation tool, wherein the vehicle speed limiting operation prohibition unit is configured as an attachment and detachment mechanism for attaching and detaching the vehicle speed limiting operation tool to and from a member included in the travel body, wherein even after the vehicle speed limiting operation tool is detached from the travel body, the vehicle speed upper limit display section is held in the travel body, wherein the vehicle speed upper limit display section has a vehicle speed upper limit indicator mechanically linked to operation of the vehicle speed limiting operation tool, and wherein the vehicle speed limiting operation tool, the vehicle speed limiting operation prohibition unit, and the vehicle speed upper limit indicator are integral.

2. The utility vehicle according to claim 1, further comprising a gear shift control system, wherein the gear shift control system comprises a power control unit and a gear shift control unit, and the gear shift control unit comprises a vehicle speed limit management unit, wherein the vehicle speed limit management unit generates a vehicle speed limit command based on a vehicle speed control command generated through an operation on the vehicle speed limit operation tool, the vehicle speed limit command is recorded by the vehicle speed limit management unit, and when a new vehicle speed limit command is input, the recorded vehicle speed limit command is overwritten with the new vehicle speed limit command.

* * * * *